United States Patent
Yang

(10) Patent No.: US 11,937,055 B2
(45) Date of Patent: Mar. 19, 2024

(54) VOICE ACQUISITION CONTROL METHOD AND DEVICE, AND TWS EARPHONES

(71) Applicant: GOERTEK INC., Shandong (CN)

(72) Inventor: Zongxu Yang, Shandong (CN)

(73) Assignee: GOERTEK INC., Shandong (CN)

( * ) Notice: Subject to any disclaimer, the term of this patent is extended or adjusted under 35 U.S.C. 154(b) by 262 days.

(21) Appl. No.: 17/608,322

(22) PCT Filed: Sep. 29, 2019

(86) PCT No.: PCT/CN2019/109022
§ 371 (c)(1),
(2) Date: Nov. 2, 2021

(87) PCT Pub. No.: WO2020/258570
PCT Pub. Date: Dec. 30, 2020

(65) Prior Publication Data
US 2022/0167084 A1    May 26, 2022

(30) Foreign Application Priority Data

Jun. 28, 2019   (CN) .......................... 201910576125.1

(51) Int. Cl.
*H04R 3/00* (2006.01)
*G06F 3/16* (2006.01)
(Continued)

(52) U.S. Cl.
CPC ............ *H04R 3/005* (2013.01); *G06F 3/165* (2013.01); *G10L 15/08* (2013.01); *G10L 15/22* (2013.01);
(Continued)

(58) Field of Classification Search
None
See application file for complete search history.

(56) References Cited

U.S. PATENT DOCUMENTS

| 2012/0284023 A1 | 11/2012 | Vitte et al. |
| 2017/0238109 A1 | 8/2017 | Gong |

(Continued)

FOREIGN PATENT DOCUMENTS

| CN | 102498709 | 6/2012 |
| CN | 104270489 | 1/2015 |

(Continued)

OTHER PUBLICATIONS

Gong, CN109151211 "Speech processing method, device thereof and electronic equipment", English translation provided by EPO. 11 pages. (Year: 2018).*

(Continued)

*Primary Examiner* — Qin Zhu
(74) *Attorney, Agent, or Firm* — HAUPTMAN HAM, LLP

(57) ABSTRACT

A method for speech collection control applied to a master earphone is provided. The method includes: activating a microphone of the master earphone to collect noise and transmitting an activating instruction to a slave earphone, when a user speech is detected, so that the slave earphone controls a microphone of the slave earphone to collect noise in response to the activating instruction; determining an earphone located in an environment with lower noise based on noise data collected by the master earphone and noise data collected by the slave earphone; and controlling a microphone of the earphone located in the environment with lower noise to collect the user speech. A method for speech collection control applied to a slave earphone is further provided.

10 Claims, 5 Drawing Sheets

(51) Int. Cl.
*G10L 15/08* (2006.01)
*G10L 15/22* (2006.01)
*G10L 21/0216* (2013.01)
*G10L 25/84* (2013.01)
*H04R 1/10* (2006.01)
*H04R 1/40* (2006.01)
*H04R 29/00* (2006.01)

(52) U.S. Cl.
CPC ............ *G10L 25/84* (2013.01); *H04R 1/1016* (2013.01); *H04R 1/1041* (2013.01); *H04R 1/406* (2013.01); *H04R 29/005* (2013.01); *G10L 2015/088* (2013.01); *G10L 2015/223* (2013.01); *H04R 2410/05* (2013.01); *H04R 2420/07* (2013.01)

(56) References Cited

U.S. PATENT DOCUMENTS

| | | | | |
|---|---|---|---|---|
| 2018/0090153 | A1* | 3/2018 | Hoshuyama | H04M 1/6008 |
| 2019/0074023 | A1* | 3/2019 | Jhawar | G10L 21/02 |
| 2019/0259381 | A1* | 8/2019 | Ebenezer | H04R 3/005 |
| 2019/0272842 | A1* | 9/2019 | Bryan | G10L 21/0272 |
| 2021/0392445 | A1* | 12/2021 | Oosugi | H04R 25/603 |

FOREIGN PATENT DOCUMENTS

| | | |
|---|---|---|
| CN | 105469819 | 4/2016 |
| CN | 105611014 | 5/2016 |
| CN | 105847497 | 8/2016 |
| CN | 106303804 | 1/2017 |
| CN | 106331359 | 1/2017 |
| CN | 206533526 | 9/2017 |
| CN | 107452375 | 12/2017 |
| CN | 108766431 | 11/2018 |
| CN | 108882087 | 11/2018 |
| CN | 108886647 | 11/2018 |
| CN | 109151211 | 1/2019 |
| CN | 109151644 | 1/2019 |
| CN | 109413526 | 3/2019 |
| CN | 109712626 | 5/2019 |
| CN | 110166879 | 8/2019 |
| WO | WO2011134212 | 11/2011 |

OTHER PUBLICATIONS

International Search Report issued in PCT/CN2019/109022 dated Mar. 26, 2020.

* cited by examiner

VOICE ACQUISITION CONTROL METHOD AND DEVICE, AND TWS EARPHONES

This application is a 371 application of PCT international patent application PCT/CN2019/109022, filed on Sep. 29, 2019 which claims priority to Chinese Patent Application No. 201910576125.1, titled "VOICE ACQUISITION CONTROL METHOD AND DEVICE, AND TWS EARPHONES", filed on Jun. 28, 2019 with the China National Intellectual Property Administration (CNIPA), both of which are incorporated herein by reference in their entireties.

FIELD

The present disclosure relates to the technical field of audio noise reduction, and in particular to a method for speech collection control, a device for speech collection control, and a TWS earphone.

BACKGROUND

With development of technology and upgrading of network and cloud services, intelligence requirement of an earphone becomes increasingly important. Releases of voice assistant platforms from manufacturers such as Apple, Google, and Baidu indicate that voice assistants have become a standard configuration of smart earphones. When interacting with a voice assistant of a terminal, an earphone needs to collect a speech from a user. In a conventional technology, a master earphone is always selected to collect a user speech. Practically, in many cases, the master earphone may be in a sound environment different from that for a slave earphone, and such fixed speech collection control method cannot adapt to environmental noise, resulting in that much environmental noise is included in a speech signal collected by the master earphone, reducing quality of the collected speech, increasing noise interference, and thus degrading user experience.

SUMMARY

According to the present disclosure, a method and a device for speech collection control, and a TWS earphone are provided, in order to reduce environmental noise included in a speech signal collected by an earphone, improve quality of a collected speech, reduce noise interference, and improve a user experience.

To solve the above technical problems, a method for speech collection control applied to a master earphone is provided according to the present disclosure. The method includes: activating a microphone of the master earphone to collect noise and transmitting an activating instruction to a slave earphone, when a user speech is detected, so that the slave earphone controls a microphone of the slave earphone to collect noise in response to the activating instruction; determining an earphone located in an environment with lower noise based on noise data collected by the master earphone and noise data collected by the slave earphone; and controlling a microphone of the earphone located in the environment with lower noise to collect the user speech.

In an embodiment, the activating instruction includes a start time point for noise collection and an interval. The process of collecting noise by the slave earphone in response to the activating instruction includes: controlling, by the slave earphone, the microphone of the slave earphone, to collect noise since the start time point for noise collection, and transmitting, by the slave earphone, collected noise data to the master earphone with the interval.

In an embodiment, after activating a microphone of the master earphone to collect noise and transmitting an activating instruction to the slave earphone, and before determining an earphone located in an environment with lower noise based on noise data collected by the master earphone and noise data collected by the slave earphone, the method further includes: detecting a keyword based on the noise data collected by the master earphone; transmitting, if a keyword is detected, an instruction indicating a successful keyword detection to the slave earphone, to control the master earphone and the slave earphone to stop detecting noise and proceed to a subsequent step; and transmitting, if no keyword is detected, an instruction indicating a failed keyword detection to the slave earphone, to control the master earphone and the slave earphone to stop detecting noise and terminate a current speech collection.

In an embodiment, in a case where the earphone located in the environment with lower noise is the slave earphone, the method further includes: granting a permission for speech collection to the microphone of the master earphone, after receiving an instruction indicating that a speech collection is finished transmitted from the slave earphone when collecting of the user speech is finished.

In an embodiment, after controlling the microphone of the earphone located in an environment with lower noise to collect the user speech, the method further includes: processing the collected user speech and transmitting the processed user speech to a voice assistant of a terminal.

In an embodiment, the master earphone and the slave earphone each include an external microphone arranged outside an earphone body and an internal microphone arranged inside the earphone body. The process of activating a microphone of the master earphone to collect noise and transmitting an activating instruction to a slave earphone, when a user speech is detected, so that the slave earphone controls a microphone of the slave earphone to collect noise in response to the activating instruction includes: activating the external microphone of the master earphone to collect noise and transmitting an activating instruction to a slave earphone, when a user speech is detected through the internal microphone of the master earphone, so that the slave earphone controls the external microphone of the slave earphone to collect noise in response to the activating instruction. The process of controlling the microphone of the earphone located in an environment with lower noise to collect the user speech includes: controlling the external microphone of the earphone located in the environment with lower noise to collect the user speech.

In an embodiment, the process of determining an earphone located in an environment with lower noise based on noise data collected by the master earphone and noise data collected by the slave earphone includes: acquiring noise data from the master earphone and noise data from the slave earphone that is collected in a same time period; obtaining average loudness of the master earphone in multiple frequency bands based on the noise data from the master earphone in the time period, and average loudness of the slave earphone in the multiple frequency bands based on the noise data from the slave earphone in the time period, where the multiple frequency bands are different from each other; and determining, by comparing the average loudness of the master earphone with the average loudness of the slave earphone for each of the multiple frequency bands, an earphone having lower average loudness in more frequency bands as the earphone located in the environment with lower noise.

To solve the above technical problems, a method for speech collection control applied to a slave earphone is further provided according to the present disclosure. The method includes: receiving an activating instruction transmitted from a master earphone when a user speech is detected, where a microphone of the master earphone is activated to collect noise when the user speech is detected; and controlling, in response to the activating instruction, a microphone of the slave earphone to collect noise, so that the master earphone determines an earphone located in an environment with lower noise based on noise data collected by the master earphone and noise data collected by the slave earphone, and controlling a microphone of the earphone located in the environment with lower noise to collect the user speech.

In an embodiment, the activating instruction includes a start time point for noise collection and an interval. The process of controlling, in response to the activating instruction, a microphone of the slave earphone to collect noise includes: controlling the microphone of the slave earphone to collect noise since the start time point for noise collection, and transmitting collected noise data to the master earphone with the interval.

In an embodiment, in a case where the earphone located in the environment with lower noise is the slave earphone, the method further includes: transmitting, after collecting of the user speech is finished, an instruction indicating that speech collection is finished to the master earphone, and granting a permission for speech collection to the microphone of the master earphone.

To solve the above technical problems, a device for speech collection control applied to a master earphone is further provided according to the present disclosure. The device includes an activating module, a noise processing module, and a control module.

The activating module is configured to activate a microphone of the master earphone to collect noise and transmit an activating instruction to a slave earphone, when a user speech is detected, so that the slave earphone controls, in response to the activating instruction, a microphone of the slave earphone to collect noise. The noise processing module is configured to determine an earphone located in an environment with lower noise based on noise data collected by the master earphone and noise data collected by the slave earphone. The control module is configured to control a microphone of the earphone located in the environment with lower noise to collect the user speech.

To solve the above technical problems, a device for speech collection control applied to a slave earphone is further provided according to the present disclosure. The device includes a receiving module and a control module. The receiving module is configured to receive an activating instruction transmitted from a master earphone when a user speech is detected, where a microphone of the master earphone is activated to collect noise when the user speech is detected. The control module is configured to control, in response to the activating instruction, a microphone of the slave earphone to collect noise, so that the master earphone determines an earphone located in an environment with lower noise based on noise data collected by the master earphone and noise data collected by the slave earphone, and controls a microphone of the earphone located in the environment with lower noise to collect the user speech.

To solve the above technical problems, a TWS earphone is further provided according to the present disclosure. The TWS earphone includes a microphone, a memory storing a computer program, and a processor configured to execute the computer program to perform the method for speech collection control as described above.

A method for speech collection control is provided in the present disclosure. The method is applied to a master earphone. When a user speech is detected, the master earphone controls a microphone of the master earphone and a microphone of the slave earphone to collect noise, and an earphone with lower environmental noise is determined based on noise data collected by the master earphone and noise data collected by the slave earphone, that is, the earphone located in a better sound environment is determined, and then the microphone of the earphone with lower environmental noise is controlled to collect a user speech. It can be seen that a self-adaptation to environmental noise is achieved by selecting an earphone with low environmental noise for user speech collection. Therefore, the environmental noise included in a voice signal collected by the earphone is reduced, quality of a collected speech is improved, and noise interference is reduced, thereby improving a user experience.

A device for speech collection control and a TWS earphone are further provided in the present disclosure, which can generate the same beneficial effects as the above-mentioned method for speech collection control.

BRIEF DESCRIPTION OF THE DRAWINGS

In order to illustrate technical solutions in embodiments of the present disclosure more clearly, drawings to be used in the description of the embodiments or the conventional technology are introduced simply hereinafter. It is apparent that the drawings described below show only some embodiments of the present disclosure, and other drawings may be obtained by those skilled in the art based on the provided drawings without any creative effort.

DETAILED DESCRIPTION

According to the present disclosure, a method and a device for speech collection control, and a TWS earphone are provided, in order to reduce environmental noise included in a speech signal collected by an earphone, improve quality of a collected speech, reduce noise interference, and improve a user experience.

In order to make the objective, technical solutions and advantages of embodiments of the present disclosure more clear, technical solutions in embodiments of the present disclosure are described clearly and completely below in conjunction with the drawings for the embodiments of the present disclosure. Apparently, the embodiments described in the following are only some rather than all embodiments of the present disclosure. Any other embodiments obtained by those skilled in the art based on the embodiments in the present disclosure without any creative effort shall fall within the protection scope of the present disclosure.

Figure 1:
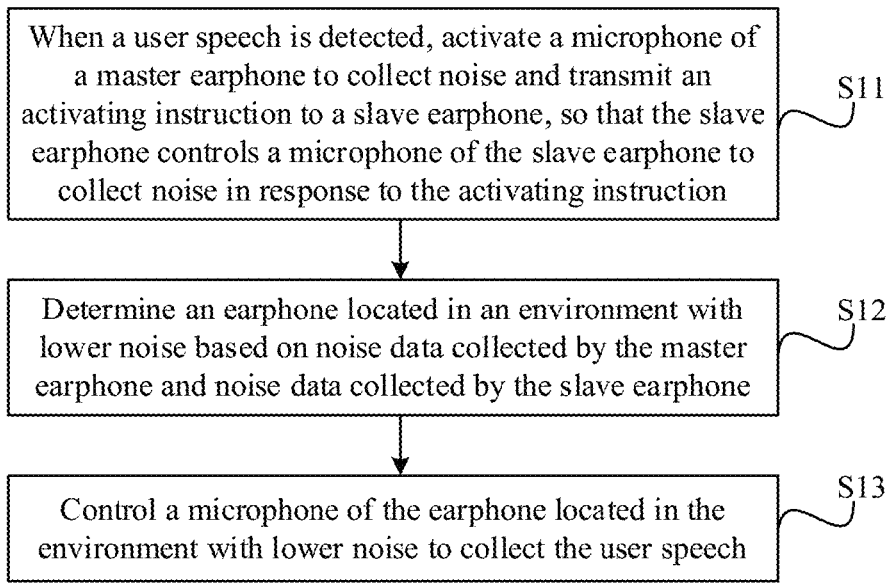
FIG. 1 is a flow chart of a method for speech collection control according to an embodiment of the present disclosure.

FIG. 1 is a flow chart of a method for speech collection control applied to a master earphone according to an embodiment of the present disclosure. Referring to FIG. 1, the method includes steps S11 to S13 as follows.

In step S11, a microphone of a master earphone is activated to collect noise and an activating instruction is transmitted to a slave earphone, when a user speech is detected, so that the slave earphone controls a microphone of the slave earphone to collect noise in response to the activating instruction.

In step S12, an earphone located in an environment with lower noise is determined based on noise data collected by the master earphone and noise data collected by the slave earphone.

In step S13, a microphone of the earphone located in the environment with lower noise is controlled to collect the user speech.

Different from the conventional technology in which the master earphone is always selected to collect a user speech, in the solution according to the present disclosure, a certain earphone is not always selected for speech collection, and selection is performed based on a sound environment where an earphone is located. Specifically, the earphone located in an environment with lower noise, that is, the earphone on a low-noise side, is selected to perform speech collection, thereby realizing a self-adaptation to the environmental noise.

It is to be noted that in the present disclosure, both the master earphone and the slave earphone are provided with microphones, for example, with an internal microphone and an external microphone. The numbers of the internal microphones and the external microphones may be determined based on an actual situation, and are not limited herein. In addition, a connection is established between the master earphone and the slave earphone. The connection may be a wireless connection which may be, but is not limited to, a Bluetooth connection. Which earphone serving as the master earphone is not limited in the present disclosure.

From the perspective of power consumption, the master earphone and the slave earphone are activated to collect noise only when a user speech is detected, so as to reduce power consumption and thereby reduce load of a processor. Specifically, when the master earphone detects that a user is speaking, the master earphone activates the microphone of the master earphone for noise collection to obtain noise data, and transmits an activating instruction to the slave earphone. The slave earphone controls, in response to the received activating instruction, the microphone of the slave earphone to collect noise to obtain noise data. In practical applications, the master earphone may control the microphone of the master earphone to collect noise immediately when a user speech is detected, and simultaneously transmit an activating instruction to the slave earphone. The slave earphone performs noise collection immediately when the activating instruction is received or after a preset interval since the activating instruction is received, depending on the activating instruction.

When collecting noise, the master earphone may firsts tore the collected noise data to a buffer of the master earphone, and the slave earphone transmits the collected noise data to the master earphone to be stored in the buffer. In order to improve accuracy of the collected environmental noise, it is desired that some of the noise data is collected by the master earphone and the slave earphone in a same time period, so that the noise data collected in the same time period may be extracted for data processing to improve the accuracy in determining the environmental noise by controlling a variable. Apparently, considering that a duration for noise collection is not particularly long and the environmental noise usually does not change suddenly, data collected in different time periods (such as two adjacent time periods) may be used to determine the environmental noise. However, it is preferred that the noise data collected in a same time period is used to determine the environmental noise.

Then, a sound environment where the master earphone is located may be determined based on the noise data collected by the master earphone, and a sound environment where the slave earphone is located may be determined based on the noise data collected by the slave earphone. An earphone located in the environment with lower noise may be selected and controlled to perform user speech collection. Specifically, if the environment where the master earphone is located has lower noise, the master earphone directly controls the microphone of the master earphone to collect the user speech, and the microphone of the slave earphone does not work at this time. If the environment where the slave earphone is located has lower noise, the master earphone transmits a switching instruction to the slave earphone, and the slave earphone controls, in response to the switching instruction, the microphone of the slave earphone to work, and the microphone of the master earphone does not work at this time.

It should also be noted that the entire process from step S11 to step S13 takes a short time, such as 2 seconds, 1 second or even shorter (but should not be too short in order to ensure the accuracy for determining the environmental noise), which causes little impact or no impact on subsequent collection of the user speech.

In summary, according to the present disclosure, when a user speech is detected, the master earphone controls a microphone of the master earphone and a microphone of the slave earphone to collect noise, and an earphone with lower environmental noise is determined based on noise data collected by the master earphone and noise data collected by the slave earphone, that is, the earphone located in a better sound environment is determined, and then the microphone of the earphone with lower environmental noise is controlled to collect a user speech. It can be seen that a self-adaptation to environmental noise is achieved by selecting an earphone with low environmental noise for user speech collection. With a low-noise side being selected as a sound collection side, the environmental noise included in a voice signal collected by the earphone is reduced, quality of a collected speech is improved, and noise interference is reduced, thereby improving a user experience.

Based on the above embodiments, in another embodiment, the activating instruction includes a start time point for noise collection and an interval.

A process of collecting noise by the slave earphone in response to the activating instruction includes: controlling, by the slave earphone, the microphone of the slave earphone to collect noise since the start time point for noise collection, and transmitting collected noise data to the master earphone with the interval.

In this embodiment, the master earphone transmits an activating instruction to control the slave earphone to collect noise in response to the activating instruction; the activating instruction includes a start time point for noise collection and an interval. The slave earphone, on receipt of the activating instruction, starts to collect noise since the start time point for noise collection, and transmits the collected noise data to the master earphone with the interval. Specifically, the start time point herein may be, but is not limited to, a time instant corresponding to 10 ms after the activating instruction is received, and the interval is 100 ms, for example. The start time point and the interval are determined based on an actual situation and are not limited herein.

In addition, in practical applications, the slave earphone may transmit an acknowledgement instruction to the master earphone after the activating instruction is received, to notify the master earphone of a message that the slave earphone has correctly received the activating instruction. The master earphone may start to time after transmitting the activating instruction to the slave earphone, and may issue an abnormal alarm if no acknowledgement instruction from the slave earphone is received within a preset time period.

In an embodiment, after activating a microphone of the master earphone to collect noise and transmitting an activating instruction to the slave earphone, and before determining an earphone located in an environment with lower noise based on noise data collected by the master earphone and the noise data collected by the slave earphone, the method further includes: detecting a keyword based on the noise data collected by the master earphone; transmitting, if a keyword is detected, an instruction indicating a successful keyword detection to the slave earphone, to control the master earphone and the slave earphone to stop detecting noise and proceed to a subsequent step; and transmitting, if no keyword is detected, an instruction indicating a failed keyword detection to the slave earphone, to control the master earphone and the slave earphone to stop detecting noise and terminate a current speech collection.

In the present disclosure, keyword detection is first performed by the master earphone when noise data is detected, in order to avoid false triggers as much as possible. The keyword here may be, for example, "Siri", "Little Ai", and the like. If a keyword is detected, it is indicated that a user may speak subsequently and a speech collection is required. In this case, the master earphone transmits an instruction indicating a successful keyword detection to the slave earphone, to control the master earphone and the slave earphone to stop detecting noise, so that an earphone located in an environment with lower noise is determined subsequently based on the noise data collected by the master earphone and the noise data collected by the slave earphone. If no keyword is detected, it is indicated that a user tends to speak but no speech collection is required. In this case, the master earphone transmits an instruction indicating a failed keyword detection to the slave earphone, to control the master earphone and the slave earphone to stop detecting noise and terminates the current speech collection. In addition, regardless of whether a keyword is detected, the master earphone and the slave earphone may stop detecting noise simultaneously, so as to ensure the synchronization of collecting noise data. Apparently, the noise detection may be stopped asynchronously. Whether to stop detecting noise synchronously is not limited herein.

In this way, false trigger for subsequent user speech collection can be prevented, thereby improving reliability of user voice control. In practical applications, the technical solution in this embodiment may be combined with a user voice assistant, to improve reliability of interaction between the earphone and the voice assistant in a terminal.

In an embodiment, in a case where the earphone located in the environment with lower noise is the slave earphone, the method further includes: granting a permission for speech collection to the microphone of the master earphone after receiving an instruction indicating that a speech collection is finished transmitted from the slave earphone when collecting of the user speech is finished.

In a case where the earphone located in the environment with lower noise is the slave earphone, the master earphone grants a permission for user speech collection to the slave earphone. That is, the microphone of the master earphone does not work, and the microphone of the slave earphone starts to collect a user speech. After finishing collecting the user speech, the slave earphone transmits an instruction indicating a speech collection completion to the master earphone. The master earphone, on receipt of the instruction indicating a speech collection completion, returns to a default state in which the microphone of the master earphone detects whether the user is speaking and proceeds to a subsequent step. Specifically, the slave earphone may automatically switch off its microphone after finishing collecting the user speech, or may be controlled by the master earphone to switch off the microphone of the slave earphone after transmitting the instruction indicating a speech collection completion to the master earphone. The manner of switching off the microphone of the slave earphone is determined based on an actual situation and is not limited herein.

In addition, during the process of collecting the user speech by the slave earphone, it may be determined that the current speech collection is completed when no user speech is collected for a preset period of time (such as is or 2 s), or when an end keyword (such as "end") is collected. Other methods may be used here, and are not limited herein.

As can be seen in this embodiment that, the determination of an environment noise and the switching between the master earphone and the slave earphone based on the magnitude of environment noise are both performed by the master earphone. After finishing collecting the user speech, the slave earphone automatically switches back to a default state. In this way, the control logic is simple and time and cost for development is reduced.

In an embodiment, after controlling the microphone of the earphone located in the environment with lower noise to collect the user speech, the method further includes: processing the collected user speech and transmitting the processed user speech to a voice assistant of a terminal.

In this embodiment, the method for speech collection control is combined with a voice assistant of a terminal. Specifically, when the user speech is collected by the earphone located in an environment with lower noise, processing is performed on the user speech. The processing includes a beam-forming and a noise reduction. Then, the processed user speech is transmitted to a voice assistant module in the earphone, and the voice assistant module transmits the user speech to the voice assistant of the terminal through a communication module in the earphone. In this embodiment, the method for speech collection control is combined with the voice assistant, to improve quality of the collected user speech, thereby improving use reliability of the voice assistant.

The master earphone may process the collected user speech and transmit the processed user speech to the voice assistant of the terminal (if the user speech is collected by the slave earphone, the collected user speech may be transmitted from the slave earphone to the master earphone; the master earphone processes the user speech and transmits the processed user speech to the voice assistant of the terminal). Alternatively, the slave earphone collects the user speech, directly processes the collected user speech and transmits the processed user speech to the voice assistant of the terminal. The processing manner is determined based on an actual situation and is not limited herein.

In an embodiment, the master earphone and the slave earphone each includes an external microphone arranged outside an earphone body and an internal microphone arranged inside the earphone body.

The process of activating a microphone of a master earphone to collect noise and transmitting an activating instruction to a slave earphone, when a user speech is detected, so that the slave earphone controls a microphone of the slave earphone to collect noise in response to the activating instruction includes: activating the external microphone of the master earphone to collect noise and transmitting an activating instruction to a slave earphone, when a user speech is detected through the internal microphone of the master earphone, so that the slave earphone controls the external microphone of the slave earphone to collect noise in response to the activating instruction.

The process of controlling the microphone of the earphone located in an environment with lower noise to collect the user speech includes: controlling the external microphone of the earphone located in the environment with lower noise to collect the user speech.

Figure 2:
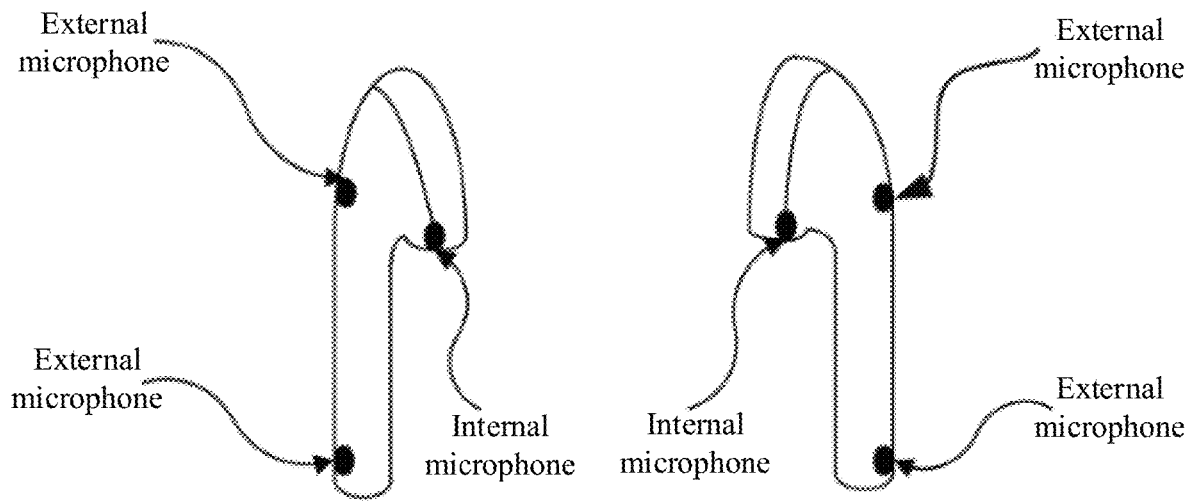
FIG. 2 is a schematic structural diagram of a master earphone and a slave earphone according to an embodiment of the present disclosure.
Figure 3:
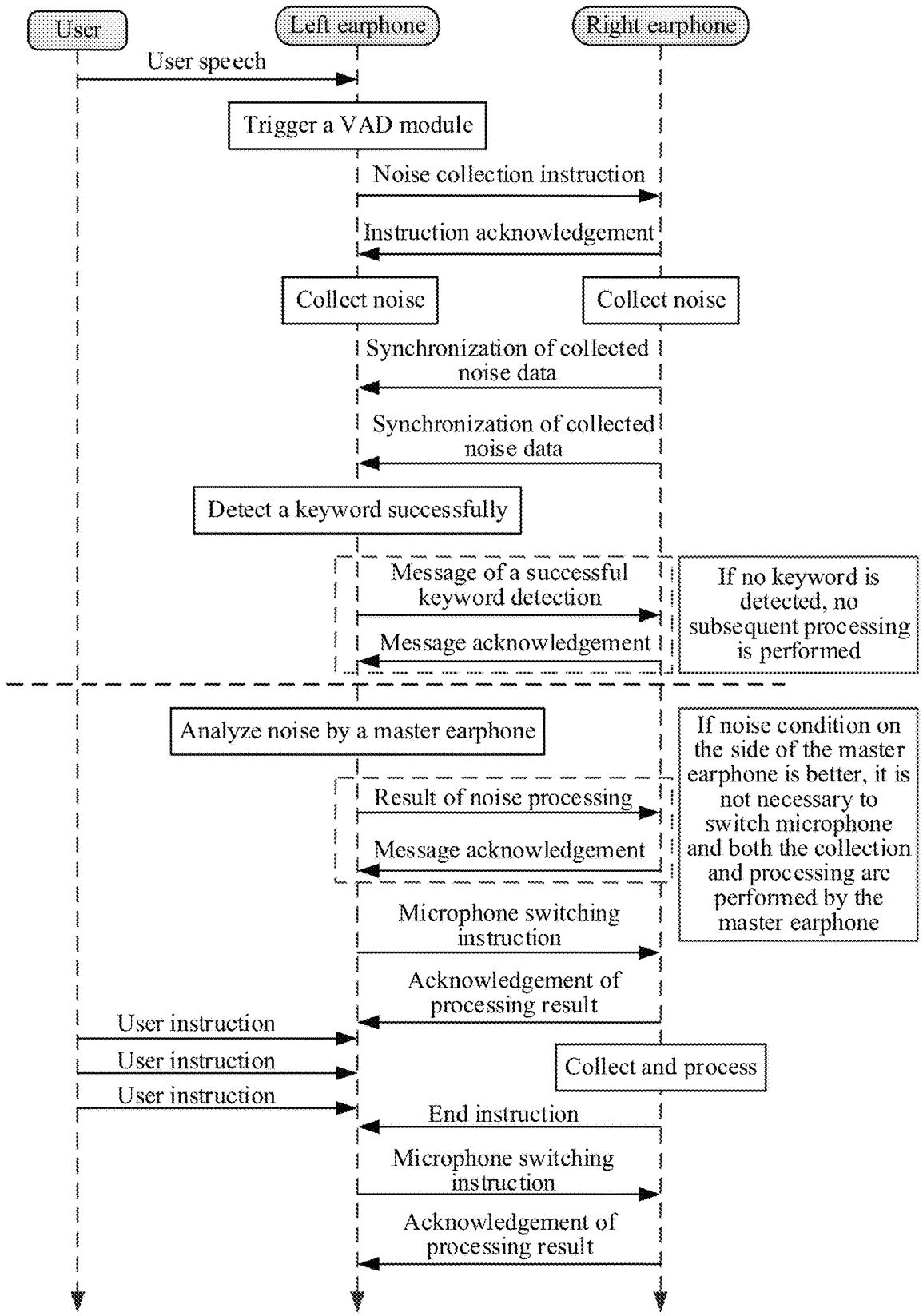
FIG. 3 is a diagram showing a principle of speech collection control according to an embodiment of the present disclosure.

FIG. 2 is a schematic structural diagram of a master earphone and a slave earphone according to the present disclosure, and FIG. 3 is a diagram showing a principle of speech collection control according to the present disclosure.

As shown in FIG. 2, two external microphones are arranged on a case of an earphone pillar and a rear case of an earphone head, respectively, and an internal microphone is arranged within the earphone head. The number of the internal microphones and the number of the external microphones may be determined based on an actual situation, and are not limited in the present disclosure.

The internal microphone may be used to detect the user speech. Specifically, when a user speaks, oral bones vibrate; and the internal microphone detects bone vibration, and thus determines that it is the current user, rather than other user, who is speaking. In this way, false triggers can be avoided, and thus the reliability of voice collection is improved. The internal microphone may transmit the collected data to a VAD (Voice Activity Detection) module. The VAD module transmits an instruction to a processor of the master earphone when it is determined based on the data collected by the internal microphone that the user is speaking. The processor activates the external microphone in response to the received instruction to collect noise. Here, the internal microphone may be a bone conduction sensor, an acceleration sensor and the like. A type of the internal microphone is not limited herein.

In the present disclosure, noise is to be collected after a user speech is detected. The collected noise is from outside of the earphone. In a case where the earphone is well isolated from the outside, the internal earphone actually collects slight voice or even collects no voice from the user. Therefore, in this embodiment, the external microphone of the master earphone and the external microphone of the slave earphone are controlled to collect noise, and a user speech is further collected by the external microphone of the earphone, thereby improving accuracy in collecting the noise data and accuracy in collecting the user speech data.

Figure 4:
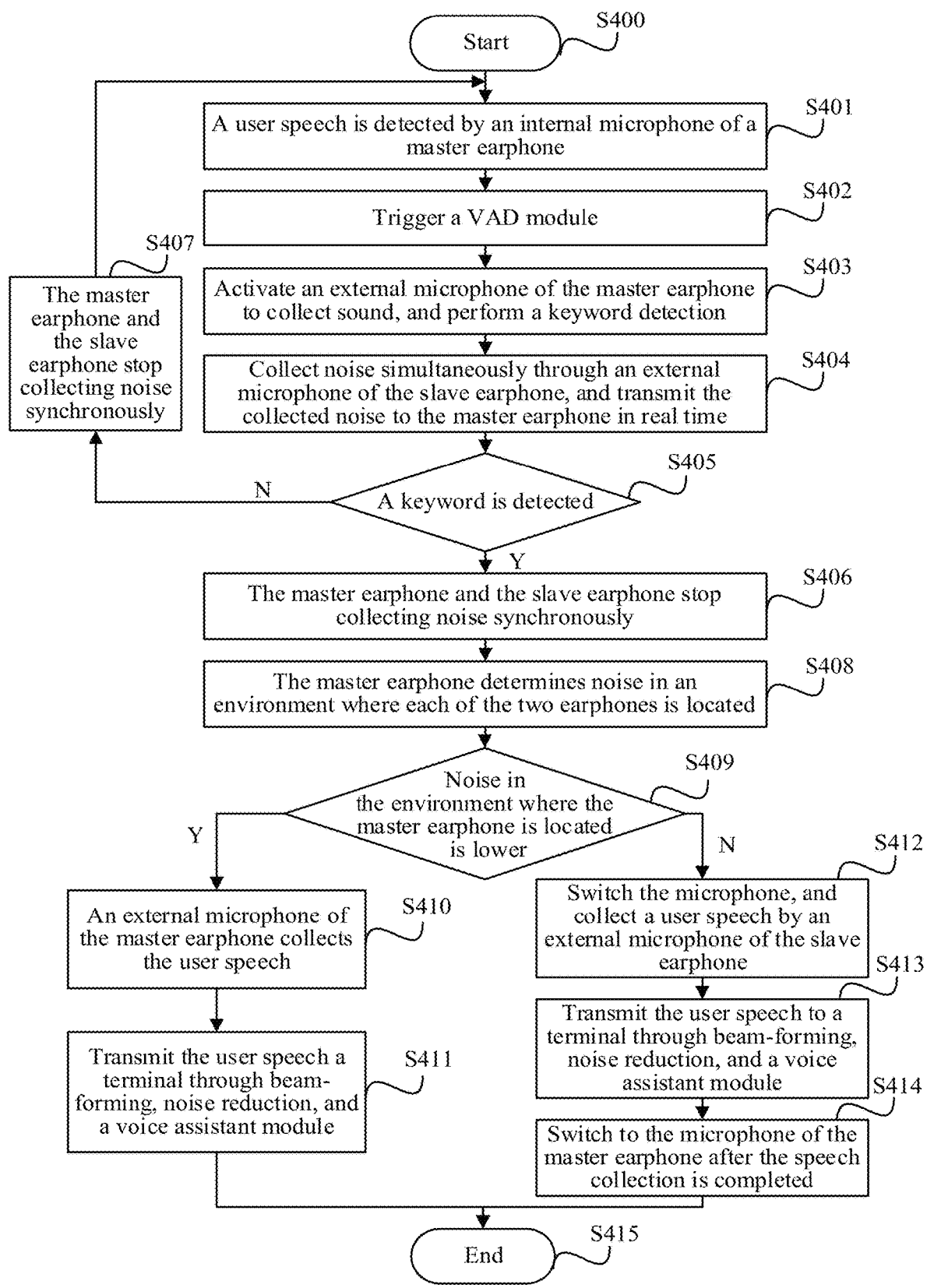
FIG. 4 is a flow chart of a method for speech collection control according to an embodiment of the present disclosure.

FIG. 4 is a flow chart of a method for speech collection control according to the present disclosure. Referring to FIG. 4, the method includes steps S400 to S415.

The method starts in step S400. In step S401, a user speech is detected by an internal microphone of a master earphone. In step S402, a VAD module is triggered. In step S403, an external microphone of the master earphone is activated to collect sound, and keyword detection is performed. In step S404, an external microphone of the slave earphone is controlled to collect noise simultaneously, and the collected noise data is transmitted to the master earphone in real time. In step S405, it is determined whether a keyword is detected. The method proceeds to step S406 if a keyword is detected, and proceeds to step S407 if no keyword is detected. In step S406, the master earphone and the slave earphone are controlled to stop collecting noise synchronously. In step S407, the master earphone and slave earphone are controlled to stop collecting noise synchronously, and the method proceeds to step S400. In step S408, noise in an environment where each of the two earphones located is determined by the master earphone. In step S409, it is determined whether the noise in the environment where the master earphone located is lower, the method proceeds to step S410 if the noise is determined to be lower, and proceeds to step S412 otherwise. In step S410, an external microphone of the master earphone is controlled to collect the user speech. In step S411, the user speech is transmitted to a terminal through beam-forming, noise reduction, and a voice assistant module, and the method proceeds to step S415. In step S412, a switching is performed to collect a user speech by an external microphone of the slave earphone. In step S413, the user speech is transmitted to a terminal through beam-forming, noise reduction, and a voice assistant module. In step S414, it is controlled to switch to the microphone of the master earphone after the speech collection is completed, and the method proceeds to step S415. The method ends in step S415.

In an embodiment, the internal microphone is an ANC feedback microphone.

Other than the above-mentioned bone conduction sensor and acceleration sensor, the internal microphone may be Active Noise Control (ANC) feedback microphone existing in some earphones, which realizes a multiplexing of the internal microphone and the ANC feedback microphone, thereby reducing space occupation in the earphone and reducing a cost.

In an embodiment, a process of determining an earphone located in an environment with lower noise based on the noise data collected by the master earphone and the noise data collected by the slave earphone includes: acquiring the noise data from the master earphone and the noise data from the slave earphone that is collected in a same time period; obtaining average loudness of the master earphone in multiple frequency bands based on the noise data from the master earphone in the time period, and average loudness of the slave earphone in the multiple frequency bands based on the noise data from the slave earphone in the time period, where the multiple frequency bands are different from each other; and determining, by comparing the average loudness of the master earphone with the average loudness of the slave earphone for each of the multiple frequency bands, an earphone having lower average loudness in more frequency bands as the earphone located in the environment with lower noise.

When the noise data is collected by the master earphone and the slave earphone, a processor of the master earphone acquires the noise data from the master earphone and the noise data from the slave earphone that is collected in a same time period (this is because that the noise data collected in a time period usually includes a multi-band speech, which leads to more accurate determination of an environmental noise); analyzes a frequency response of the noise data of the master earphone and a frequency response of the noise data of the slave headphone, to obtain average loudness of the noise data from the master earphone in different frequency bands (such as low frequency, mid frequency and high frequency), and average loudness of the noise data from the slave earphone in the mentioned different frequency bands (such as low frequency, mid frequency, and high frequency); compares, for each of different frequency bands, the average loudness of the master earphone with the average loudness of the slave earphone, that is, the average loudness of the master earphone in a low frequency band is compared with the average loudness of the slave earphone in the low frequency band, the average loudness of the master earphone in a mid frequency band is compared with the average loudness of the slave earphone in the mid frequency band, and the average loudness of the master earphone in a high frequency band is compared with the average loudness of the slave earphone in the high frequency band; and determines an earphone having lower average loudness in more frequency bands (for example, 2 or 3) as the earphone located in an environment with lower noise. Specifically, for example, if the average loudness of the master earphone is smaller than the average loudness of the slave earphone in 2 or 3 frequency bands, it is indicated that the master earphone is located in the environment with lower noise, and the master earphone is selected as the earphone located in the environment with lower noise.

It should be noted that in practical applications, a situation where the average loudness of the master earphone is identical to the average loudness of the slave earphone in multiple frequency bands seldom occurs. If such situation occurs, it is indicated that the master earphone and the slave earphone are located in environments with same noise. In this case, either of the master earphone and the slave earphone may be selected for subsequent user speech collection. For example, the master earphone is selected, by default, for collection (the master earphone is unnecessary to transmit any instruction to the slave earphone for switching, thereby simplifying the control logic).

By adopting the average value comparison provided in this embodiment, the control method is simple, a processing time is reduced, and instantaneity of speech collection by an earphone is improved.

In addition to the above method, an environmental noise may be determined in a following way. The noise data collected by the master earphone and the noise data collected by the salve earphone may each be fitted with the least squares method to obtain a frequency response curve (in which, a horizontal axis indicates the frequency and a vertical axis indicates the loudness). By analyzing whether the two frequency response curves intersect, an intersection point of the curves and a frequency band ratio of an upper curve in a case where the curves intersect, or which curve is above in a case where the curves do not intersect, the environmental noise can be determined, and thus the earphone located in the environment with lower noise is determined. Other methods may be applied for noise determination and are not limited herein.

Figure 5:
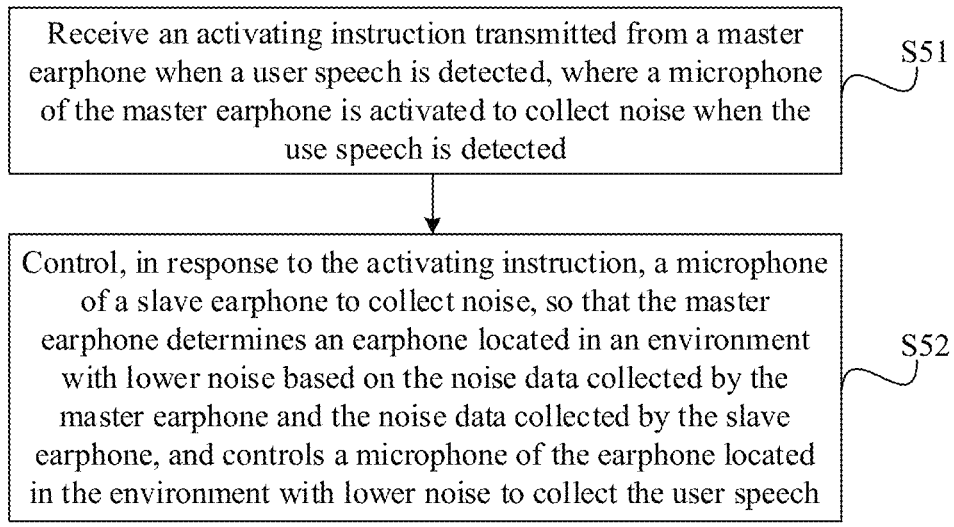
FIG. 5 is a flow chart of a method for speech collection control applied to a slave earphone according to another embodiment of the present disclosure.

FIG. 5 is a flow chart of a method for speech collection control according to another embodiment of the present disclosure. The method is applied to a slave earphone. Referring to FIG. 5, the method includes steps S51 to S52.

In step S51, an activating instruction transmitted from a master earphone when a user speech is detected is received. A microphone of the master earphone is activated to collect noise when the user speech is detected.

In step S52, a microphone of the slave earphone is controlled, in response to the activating instruction, to collect noise, so that the master earphone determines an earphone located in an environment with lower noise based on the noise data collected by the master earphone and the noise data collected by the slave earphone, and controls a microphone of the earphone located in the environment with lower noise to collect the user speech.

In an embodiment, the activating instruction includes a start time point for noise collection and an interval.

A process of controlling, in response to the activating instruction, the microphone of the slave earphone to collect noise includes: controlling the microphone of the slave earphone to collect noise since the start time point for noise collection, and transmitting collected noise data to the master earphone with the interval.

In an embodiment, in a case where the earphone located in the environment with lower noise is the slave earphone, the method further includes: transmitting, after collecting of the user speech is finished, an instruction indicating that a speech collection is finished to the master earphone, and granting a permission for speech collection to the microphone of the master earphone.

This embodiment illustrates the method for speech collection control applied to a slave earphone paired with a master earphone. For introduction of the method for speech collection control applied to a slave earphone provided in this embodiment, one may refer to the above embodiments. Details are not repeated herein.

Figure 6:
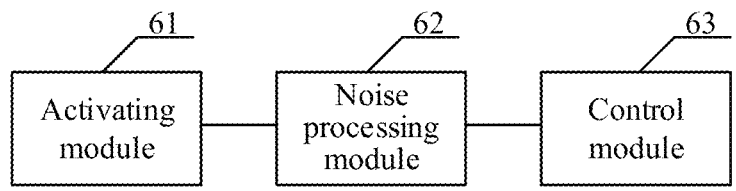
FIG. 6 is a schematic structural diagram of a device for speech collection control according to an embodiment of the present disclosure.

FIG. 6 is a schematic structural diagram of a device for speech collection control according to an embodiment of the present disclosure. The device is applied to a master earphone and includes an activating module 61, a noise processing module 62 and a control module 63.

The activating module 61 is configured to activate a microphone of the master earphone to collect noise and transmit an activating instruction to a slave earphone, when a user speech is detected, so that the slave earphone controls, in response to the activating instruction, a microphone of the slave earphone to collect noise.

The noise processing module 62 is configured to determine an earphone located in an environment with lower noise based on noise data collected by the master earphone and noise data collected by the slave earphone.

The control module 63 is configured to control a microphone of the earphone located in the environment with lower noise to collect the user speech.

The device in this embodiment corresponds to the method for speech collection control applied to a master earphone. For introduction of the device for speech collection control applied to a master earphone provided in this embodiment, one may refer to the above embodiments. Details are not repeated herein.

Figure 7:
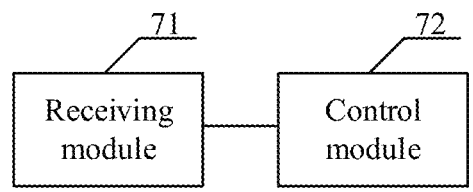
FIG. 7 is a schematic structural diagram of a device for speech collection control according to another embodiment of the present disclosure.

FIG. 7 is a schematic structural diagram of a device for speech collection control according to another embodiment of the present disclosure. The device is applied to a slave earphone and includes a receiving module 71 and a control module 72.

The receiving module 71 is configured to receive an activating instruction transmitted by a master earphone when a user speech is detected. A microphone of the master earphone is activated to collect noise when the user speech is detected.

The control module 72 is configured to control, in response to the activating instruction, a microphone of the slave earphone to collect noise, so that the master earphone determines an earphone located in an environment with lower noise based on noise data collected by the master earphone and noise data collected by the slave earphone, and controls a microphone of the earphone located in the environment with lower noise to collect the user speech.

The device in this embodiment corresponds to the method for speech collection control applied to a slave earphone paired with a master earphone. For introduction of the device for speech collection control applied to a slave earphone provided in this embodiment, one may refer to the above embodiments. Details are not repeated herein.

A master earphone is further provided according to the present disclosure. The master earphone includes a microphone, a memory configured to store a computer program, and a processor configured to execute the computer program to perform the method for speech collection control applied to a master earphone as described above.

The master earphone in this embodiment corresponds to the method for speech collection control applied to a master earphone. For introduction of the master earphone provided in this embodiment, one may refer to the above embodiments. Details are not repeated herein.

A slave earphone is further provided according to the present disclosure. The slave earphone includes a microphone, a memory configured to store a computer program, and a processor configured to execute the computer program to perform the method for speech collection control applied to a slave earphone as described above.

The slave earphone in this embodiment corresponds to the method for speech collection control applied to a slave earphone. For introduction of the slave earphone provided in this embodiment, one may refer to the above embodiments. Details are not repeated herein.

Figure 8:
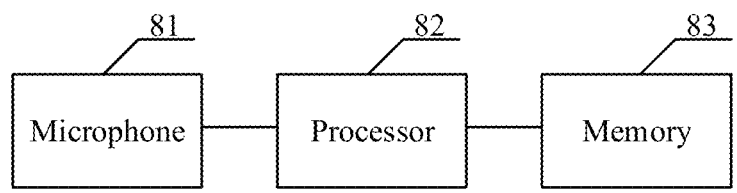
FIG. 8 is a schematic structural diagram of a TWS earphone according to an embodiment of the present disclosure.

FIG. 8 is a schematic structural diagram of a TWS earphone according to an embodiment of the present disclosure. Referring to FIG. 8, the TWS earphone includes a microphone 81, a memory 83 configured to store a computer program, and a processor 82 configured to execute the computer program to perform the method for speech collection control as described above.

The TWS earphone includes a master earphone and a slave earphone. For introduction of the TWS (True Wireless) earphone according to this embodiment, one may refer to the above embodiments. Details are not repeated herein.

It should be noted that, terms "include", "comprise" or any other variants thereof are intended to be non-exclusive. Therefore, a process, method, article or device including multiple elements includes not only the elements but also other elements that are not enumerated, or also includes the elements inherent to the process, method, article or device. Unless expressively limited otherwise, a process, method, article or device limited by "comprising/including a(n) . . . " does not exclude existence of another identical element in such process, method, article or device.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present disclosure should not be limited to the embodiments disclosed herein, but has the widest scope in accordance to the principle and the novel features disclosed herein.

The invention claimed is:

1. A method for speech collection control applied to a master earphone, comprising:
activating a microphone of the master earphone to collect noise and transmitting an activating instruction to a slave earphone, when a user speech is detected, so that the slave earphone controls a microphone of the slave earphone to collect noise in response to the activating instruction;
determining an earphone located in an environment with lower noise based on noise data collected by the master earphone and noise data collected by the slave earphone; and
controlling a microphone of the earphone located in the environment with lower noise to collect the user speech,
wherein the activating instruction comprises a start time point for noise collection and an interval, and
a process of collecting noise by the slave earphone in response to the activating instruction comprises:
controlling, by the slave earphone, the microphone of the slave earphone to collect noise since the start time point for noise collection, and transmitting, by the slave earphone, collected noise data to the master earphone with the interval.

2. The method for speech collection control according to claim 1, wherein after the activating a microphone of the master earphone to collect noise and transmitting an activating instruction to a slave earphone, and before the determining an earphone located in an environment with lower noise based on noise data collected by the master earphone and noise data collected by the slave noise, the method further comprises:
detecting a keyword based on the noise data collected by the master earphone;
transmitting, in response to the keyword being detected, an instruction indicating a successful keyword detection to the slave earphone, to control the master earphone and the slave earphone to stop detecting noise and proceed to a subsequent step; and
transmitting, in response to the keyword being not detected, an instruction indicating a failed keyword detection to the slave earphone, to control the master earphone and the slave earphone to stop detecting noise and terminate a current speech collection.

3. The method for speech collection control according to claim 1, wherein in a case where the earphone located in the environment with lower noise is the slave earphone, the method further comprises:
granting a permission for speech collection to the microphone of the master earphone after receiving an instruction indicating that a speech collection is finished transmitted from the slave earphone when collecting of the user speech is finished.

4. The method for speech collection control according to claim 1, wherein after the controlling the microphone of the earphone located in an environment with lower noise to collect the user speech, the method further comprises:

processing the collected user speech and transmitting the processed user speech to a voice assistant of a terminal.

5. The method for speech collection control according to claim 1, wherein the master earphone and the slave earphone each comprise an external microphone arranged outside an earphone body and an internal microphone arranged inside the earphone body;

and wherein the activating a microphone of the master earphone to collect noise and transmitting an activating instruction to a slave earphone, when a user speech is detected, so that the slave earphone controls a microphone of the slave earphone to collect noise in response to the activating instruction comprises:

activating the external microphone of the master earphone to collect noise and transmitting an activating instruction to a slave earphone, when a user speech is detected through the internal microphone of the master earphone, so that the slave earphone controls the external microphone of the slave earphone to collect noise in response to the activating instruction, and the controlling the microphone of the earphone located in an environment with lower noise to collect the user speech comprises:

controlling the external microphone of the earphone located in the environment with lower noise to collect the user speech.

6. The method for speech collection control according to claim 1, wherein the determining an earphone located in an environment with lower noise based on noise data collected by the master earphone and noise data collected by the slave noise comprises:

acquiring noise data from the master earphone and noise data from the slave earphone that is collected in a same time period;

obtaining average loudness of the master earphone in a plurality of frequency bands based on the noise data from the master earphone in the time period, and average loudness of the slave earphone in the plurality of frequency bands based on the noise data from the slave earphone in the time period, wherein the plurality of frequency bands are different from each other; and determining, by comparing the average loudness of the master earphone with the average loudness of the slave earphone for each of the plurality of frequency bands, an earphone having lower average loudness in more frequency bands as the earphone located in the environment with lower noise.

7. A method for speech collection control applied to a slave earphone, comprising:

receiving an activating instruction transmitted from a master earphone when a user speech is detected, wherein a microphone of the master earphone is activated to collect noise when the user speech is detected; and controlling, in response to the activating instruction, a microphone of the slave earphone to collect noise, so that the master earphone determines an earphone located in an environment with lower noise based on noise data collected by the master earphone and noise data collected by the slave earphone, and controlling a microphone of the earphone located in the environment with lower noise to collect the user speech, wherein the activating instruction comprises a start time point for noise collection and an interval, and the controlling, in response to the activating instruction, the microphone of the slave earphone to collect noise comprises:

controlling the microphone of the slave earphone to collect noise since the start time point for noise collection, and transmitting collected noise data to the master earphone with the interval.

8. The method for speech collection control according to claim 7, wherein in a case where the earphone located in the environment with lower noise is the slave earphone, the method further comprises:

transmitting, after collecting of the user speech is finished, an instruction indicating that speech collection is finished to the master earphone, and granting a permission for speech collection to the microphone of the master earphone.

9. A TWS earphone, comprising:

a microphone;

a memory configured to store a computer program; and a processor configured to execute the computer program to perform the method for speech collection control according to claim 1.

10. A TWS earphone, comprising:

a microphone;

a memory configured to store a computer program; and a processor configured to execute the computer program to perform the method for speech collection control according to claim 7.

* * * * *